United States Patent
Li et al.

(10) Patent No.: US 10,145,363 B2
(45) Date of Patent: Dec. 4, 2018

(54) METHOD FOR PERFORMING UP-TOWER MAINTENANCE ON A GEARBOX BEARING OF A WIND TURBINE

(71) Applicant: General Electric Company, Schenectady, NY (US)

(72) Inventors: Rong Li, Shanghai (CN); Michael Garry, Stateline, NV (US); John Thomas Murphy, Niskayuna, NY (US); Priyangu Chunilal Patel, Simpsonville, SC (US); Lawrence Keith Taliaferro, Greenville, SC (US); Gregory Clarence Thomas, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 15/331,937

(22) Filed: Oct. 24, 2016

(65) Prior Publication Data

US 2017/0122296 A1      May 4, 2017

(30) Foreign Application Priority Data

Oct. 30, 2015    (CN) .......................... 2015 1 0909525

(51) Int. Cl.
*B23P 6/00*      (2006.01)
*F03D 80/50*     (2016.01)
(Continued)

(52) U.S. Cl.
CPC ................ *F03D 80/70* (2016.05); *B23P 6/00* (2013.01); *B23P 6/002* (2013.01); *F03D 80/50* (2016.05);
(Continued)

(58) Field of Classification Search
CPC ........ B23P 6/00; B23P 6/002; F05B 2230/80; F03D 80/80; F03D 80/88; F03D 80/50; F03D 80/70; Y02E 10/722; Y10T 29/49318; Y10T 29/49316; Y10T 29/49696; Y10T 29/49698; Y10T 29/497; Y10T 29/49726
See application file for complete search history.

(56) References Cited

U.S. PATENT DOCUMENTS

8,769,815 B2 *   7/2014   Shiraishi ................. B23P 6/002
                                                                29/244
9,057,360 B2 *   6/2015   Tobinaga .................. F03D 9/25
(Continued)

*Primary Examiner* — Jermie Cozart
(74) *Attorney, Agent, or Firm* — Dority & Manning, P.A.

(57) ABSTRACT

The invention relates to a method for performing up-tower maintenance on a gearbox bearing of a wind turbine. In particular, a method for performing up-tower maintenance on a gearbox of a wind turbine is disclosed. The gearbox has at least one bearing with an outer race and an inner race that rotates with respect to the outer race. The method includes forming a through-hole in a front cover of the gearbox, the front cover being stationary with respect to an axis of rotation of the bearing. The method also includes forming a recess in the outer race of the bearing. Further, the method includes inserting a connecting member through the through-hole and the recess so as to prevent movement of the outer race of the bearing with respect to a torque arm of the gearbox.

10 Claims, 10 Drawing Sheets

(51) Int. Cl.
*F03D 80/70* (2016.01)
*F16H 57/08* (2006.01)
*F03D 80/80* (2016.01)
*F03D 15/00* (2016.01)

(52) U.S. Cl.
CPC .......... *F03D 80/80* (2016.05); *F16H 57/082* (2013.01); *F03D 15/00* (2016.05); *F05B 2240/54* (2013.01); *F05B 2260/40311* (2013.01); *F05B 2260/98* (2013.01); *Y02E 10/722* (2013.01); *Y10T 29/49318* (2015.01); *Y10T 29/49696* (2015.01); *Y10T 29/49698* (2015.01); *Y10T 29/49726* (2015.01)

(56) References Cited

U.S. PATENT DOCUMENTS

| | | | | |
|---|---|---|---|---|
| 2009/0285693 | A1* | 11/2009 | Bech | F16C 19/18 416/248 |
| 2009/0289460 | A1* | 11/2009 | Bech | F03D 80/70 290/55 |
| 2010/0247311 | A1* | 9/2010 | Schlangen | F03D 80/50 416/61 |
| 2011/0222804 | A1* | 9/2011 | Okano | F16C 19/38 384/471 |
| 2015/0135534 | A1* | 5/2015 | Viscome | F03D 1/001 29/889 |

* cited by examiner

METHOD FOR PERFORMING UP-TOWER MAINTENANCE ON A GEARBOX BEARING OF A WIND TURBINE

FIELD OF THE INVENTION

The present disclosure relates in general to wind turbines and, more particularly, to methods for performing up-tower maintenance on a bearing of a wind turbine gearbox so as to prevent undesired movement of the bearing.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gear system, or if a gear system is not used, directly to the generator. The generator then converts the mechanical energy to electrical energy that may be deployed to a utility grid.

Various bearings may rotatably support various rotating components in the wind turbine. For example, the gearbox includes a front bearing that supports the low-speed gearbox shaft and a rear bearing that supports the high-speed generator shaft. Such bearings typically includes an inner race, an outer race, and a plurality of rolling elements disposed therebetween so as to allow rotation of the inner and outer races with respect to each other. Thus, one of the races may be stationary while the other race rotates. More particularly, the front bearing of the gearbox typically includes an inner race that rotates with respect to a stationary outer race via rolling elements arranged between the races. Further, the inner race is typically mounted to the low-speed shaft for rotation therewith. In some instances, the stationary outer race may have a design flaw or may become worn during operation, thereby causing undesirable movement of the outer race within the gearbox. For example, the outer race may start to move relative to the torque arm, which can cause damage to the torque arm of the gearbox.

In such instances, the wind turbine must be shut down so that the gearbox can be lowered to the ground and repaired or replaced. Such repair methods are costly and time-consuming.

Thus, an improved method for performing up-tower maintenance on a gearbox bearing of a wind turbine so as to prevent undesired movement of the bearing would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for preventing undesirable movement of a bearing of a wind turbine gearbox with respect to a torque arm of the gearbox. The bearing has an outer race and an inner race that rotates with respect to the outer race via one or more rolling elements. The method includes securing the outer race of the bearing to a stationary front cover of the torque arm, so as to prevent movement of the outer race of the bearing with respect to the torque arm. Further, the front cover (as well as the torque arm to which the front cover is fixed) is stationary with respect to an axis of rotation of the bearing.

In one embodiment, the step of securing the outer race of the bearing to the stationary front cover of the torque arm of the gearbox may include: forming a through-hole in the front cover of the torque arm of the gearbox, forming a recess in the outer race of the bearing, and inserting a connecting member through the through-hole and the recess so as to prevent movement of the outer race of the bearing with respect to a torque arm of the gearbox.

In another embodiment, the method may include forming a through-hole in an front cover of the torque arm of the gearbox. In a further embodiment, the method may include applying a covering or seal at a machining-exit side of the through-hole of the front cover. Thus, the covering or seal is configured to prevent machining chips or scraps from exiting the through-hole of the front cover. In another embodiment, the step of forming the through-hole in the front cover may further include uninstalling the front cover from an installed position, moving the front cover to a maintenance position, wherein the maintenance position provides a machining-entry side of the front cover being disposed at a greater distance from the bearing than the installed position, and securing the front cover to the torque arm at the maintenance position. As such, the maintenance position reduces a likelihood of machining chips entering the bearing.

In further embodiments, the step of securing the front cover to the torque arm in the maintenance position may further include installing a spacer between the front cover and the torque arm and securing the front cover to the torque arm via one or more fasteners. In additional embodiments, the method may include forming a through-hole in an oil spray ring of the gearbox and inserting the connecting member through the through-hole of the front cover, the through-hole of the oil spray ring and the recess of the outer race so as to prevent movement of the outer race of the bearing with respect to the torque arm of the gearbox.

In yet another embodiment, the method may include locating an oil lubrication channel or passage in the oil spray ring before forming the through-hole in the oil spray ring and selecting a location for the through-hole in the oil spray ring such that the location does not intersect the oil lubrication channel.

In still a further embodiment, the step of locating the oil lubrication channel in the oil spray ring may further include using an ultrasonic testing scan.

In additional embodiments, the method may further include providing a collection device adjacent to the oil spray ring. Thus, the collection device is configured for collecting machining chips generated during one or more of the forming steps. More specifically, in particular embodiments, the collection device may include a clearance hole within the through-hole of the front cover.

In further embodiments, the step of forming the through-hole in the oil spray ring may include uninstalling the oil spray ring from an installed position and securing the oil spray ring in a maintenance position. Thus, the machining-entry side of the oil spray ring may be disposed at a greater distance from the bearing than in the installed position. In still another embodiment, the method may include providing a covering at a machining-exit side of the through-hole of the oil spray ring, the covering being configured to prevent machining chips or scraps from exiting the through-hole.

In another aspect, the present disclosure is directed to a method for performing up-tower maintenance on a gearbox of a wind turbine. The gearbox has at least one bearing with an outer race and an inner race that rotates with respect to the outer race via one or more rolling elements. The method includes forming a through-hole in a front cover of a torque arm of the gearbox, the front cover (as well as the torque arm to which the front cover is fixed) being stationary with respect to an axis of rotation of the bearing. The method also includes forming a recess in the outer race of the bearing. Further, the method includes inserting a connecting member through the through-hole and the recess so as to prevent movement of the outer race of the bearing with respect to a torque arm of the gearbox.

In yet another aspect, the present disclosure is directed to a repair kit for performing up-tower maintenance on a gearbox of a wind turbine. The gearbox has at least one bearing with an outer race and an inner race that rotates with respect to the outer race via one or more rolling elements. The repair kit includes a machining device configured to form a through-hole in a front cover of a torque arm of the gearbox. Further, the front cover (as well as the torque arm to which the front cover is fixed) is stationary with respect to an axis of rotation of the bearing. In addition, the machining device is further configured to form a recess in the outer race of the bearing. The repair kit also includes at least one connecting member configured to fit through the through-hole of the front cover and the recess of the outer race so as to prevent movement of the outer race of the bearing with respect to a torque arm of the gearbox.

In one embodiment, the repair kit may further include a covering or seal configured at a machining-exit side of the through-hole of the front cover of the torque arm. Thus, the covering is configured to prevent machining chips or scraps from exiting the through-hole of the front cover. More specifically, in certain embodiments, the covering may be constructed of any suitable material, including but not limited to plasticine, plastic, rubber, silicone, a metal, a metal alloy, or any other suitable material.

In another embodiment, the repair kit may include one or more fasteners and/or spacers that are configured to secure the front cover in a maintenance position. For example, the maintenance position provides a machining-entry side of the front cover being disposed at a greater distance from the bearing than an installed position. Thus, the maintenance position reduces a likelihood of machining chips entering the bearing.

In additional embodiments, the machining device may be further configured to form a through-hole in an oil spray ring of the gearbox. Thus, the connecting member may be configured to fit through the through-hole of the front cover, the through-hole of the oil spray ring, and the recess of the outer race so as to prevent movement of the outer race of the bearing with respect to the torque arm of the gearbox.

In further embodiments, the repair kit may include an oil channel locator configured for locating an oil lubrication channel in the oil spray ring. More specifically, in certain embodiments, the oil channel locator may include an ultrasonic testing scan. In still additional embodiments, the repair kit may also include a collection device adjacent to the through-hole of the oil spray ring. Thus, the collection device is configured for collecting machining chips generated during one or more of the forming steps. For example, in one embodiment, the collection device may include a clearance hole within the through-hole of the front cover.

Embodiment 1. A method for preventing undesirable movement of a bearing of a wind turbine gearbox with respect to a torque arm of the gearbox, the bearing has an outer race and an inner race that rotates with respect to the outer race via one or more rolling elements, the method comprising:

securing the outer race of the bearing to a stationary front cover of a torque arm the gearbox so as to prevent movement of the outer race of the bearing with respect to the torque arm, wherein the front cover is stationary with respect to an axis of rotation of the bearing.

Embodiment 2. The method of embodiment 1, wherein securing the outer race of the bearing to the stationary front cover of the torque arm of the gearbox further comprises:

forming a through-hole in the front cover of the torque arm;

forming a recess in the outer race of the bearing; and inserting a connecting member through the through-hole and the recess so as to prevent movement of the outer race of the bearing with respect to a torque arm of the gearbox.

Embodiment 3. The method of embodiment 2, further comprising applying a covering at a machining-exit side of the through-hole of the front cover, the covering configured to prevent machining chips or scraps from exiting the through-hole of the front cover.

Embodiment 4. The method of embodiment 2, wherein the step of forming the through-hole in the front cover further comprises:

uninstalling the front cover from an installed position; and moving the front cover to a maintenance position, wherein the maintenance position provides a machining-entry side of the front cover being disposed at a greater distance from the bearing than the installed position, and securing the front cover to the torque arm in the maintenance position, the maintenance position reducing a likelihood of machining chips entering the bearing.

Embodiment 5. The method of embodiment 4, wherein securing the front cover to the torque arm in the maintenance position further comprises installing a spacer between the front cover and the torque arm and securing the front cover to the torque arm via one or more fasteners.

Embodiment 6. The method of embodiment 2, further comprising forming a through-hole in an oil spray ring of the gearbox and inserting the connecting member through the through-hole of the front cover the through-hole of the oil spray ring and the recess of the outer race so as to prevent movement of the outer race of the bearing with respect to the torque arm of the gearbox.

Embodiment 7. The method of embodiment 6, further comprising: locating an oil lubrication channel in the oil spray ring before forming the through-hole in the oil spray ring; and, selecting a location for the through-hole in the oil spray ring such that the location does not intersect the oil lubrication channel.

Embodiment 8. The method of embodiment 7, wherein the step of locating the oil lubrication channel in the oil spray ring further comprises using an ultrasonic testing scan.

Embodiment 9. The method of embodiment 8, further comprising providing a collection device adjacent to the oil spray ring, the collection device configured for collecting machining chips generated during one or more of the forming steps.

Embodiment 10. The method of embodiment 9, wherein the collection device comprises a clearance hole within the through-hole of the front cover.

Embodiment 11. The method of embodiment 6, wherein the step of forming the through-hole in the oil spray ring further comprises:

uninstalling the oil spray ring from an installed position; and securing the oil spray ring in a maintenance position, wherein a machining-entry side of the oil spray ring is disposed at a greater distance from the bearing than in the installed position.

Embodiment 12. The method of embodiment 11, further comprising applying a covering at a machining-exit side of the through-hole of the oil spray ring, the covering configured to prevent machining chips or scraps from exiting the through-hole.

Embodiment 13. A method for performing up-tower maintenance on a gearbox of a wind turbine, the gearbox having at least one bearing with an outer race and an inner race that rotates with respect to the outer race via one or more rolling elements, the method comprising:

forming a through-hole in a front cover of a torque arm of the gearbox, the front cover being stationary with respect to an axis of rotation of the bearing;

forming a recess in the outer race of the bearing; and inserting a connecting member through the through-hole and the recess so as to prevent movement of the outer race of the bearing with respect to a torque arm of the gearbox.

Embodiment 14. A repair kit for performing up-tower maintenance on a gearbox of a wind turbine, the gearbox having at least one bearing with an outer race and an inner race that rotates with respect to the outer race via one or more rolling elements, the repair kit comprising:

a machining device configured to form a through-hole in a front cover of a torque arm of the gearbox, the front cover being stationary with respect to an axis of rotation of the bearing, the machining device further configured to form a recess in the outer race of the bearing; and at least one connecting member configured to fit through the through-hole of the front cover and the recess of the outer race so as to prevent movement of the outer race of the bearing with respect to a torque arm of the gearbox.

Embodiment 15. The repair kit of embodiment 14, further comprising a covering configured at a machining-exit side of the through-hole of the front cover, the covering configured to prevent machining chips or scraps from exiting the through-hole of the front cover.

Embodiment 16. The repair kit of embodiment 14, further comprising one or more fasteners and at least one spacer configured to secure the front cover in a maintenance position, wherein the maintenance position provides a machining-entry side of the front cover being disposed at a greater distance from the bearing than an installed position, wherein the maintenance position reduces a likelihood of machining chips entering the bearing.

Embodiment 17. The repair kit of embodiment 14, wherein the machining device is further configured to form a through-hole in an oil spray ring of the gearbox, wherein the connecting member is configured to fit through the through-hole of the front cover, the through-hole of the oil spray ring, and the recess of the outer race so as to prevent movement of the outer race of the bearing with respect to the torque arm of the gearbox.

Embodiment 18. The repair kit of embodiment 14, further comprising an oil channel locator configured for locating an oil lubrication channel in the oil spray ring.

Embodiment 19. The repair kit of embodiment 18, wherein the oil channel locator comprises an ultrasonic testing scan.

Embodiment 20. The repair kit of embodiment 14, further comprising a collection device adjacent to the through-hole of the oil spray ring, the collection device configured for collecting machining chips generated during one or more of the forming steps.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

COMPONENT LIST

10 Wind Turbine
12 Tower
16 Nacelle
18 Rotor
20 Hub
22 Rotor Blades
24 Generator
32 Rotor Shaft
34 Generator Shaft
36 Gearbox 37 Gearbox Housing
38 Planetary Gear System
40 Planetary Carrier
42 Ring Gear
43 Bearings
44 Planet Gears
45 Central Axis
46 Sun Gear
47 Oil Channels or Passage(s)
48 Central Planet Axis
50 Carrier Bearing
52 Torque Arm
54 Inner Race
56 Outer Race
58 Rolling Elements
60 Front Cover
62 Fastener
63 Fastener
64 Oil Spray Ring
65 Spacer
66 Oil Slinger
67 Axis
68 Connecting Member
70 Through-Hole
72 Recess
74 Mounting Device
76 Distance
78 Distance
80 Covering
82 Through-Hole
86 Longitudinal Axis
88 Collection Device
90 Cover
92 Machining-Entry Side
94 Machining-Exit Side
96 Distance
97 Machining-Entry Side
98 Cover
88 Machining-Exit Side
100 Method
102 Method Step
104 Method Step
106 Method Step

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method for performing up-tower maintenance on a gearbox of a wind turbine. More specifically, the spinning of the main gearbox carrier bearing generates significant bearing bore wear out. Such wear can cause damage to the gearbox torque arm. Thus, the present disclosure provides a method of up-tower repair which can prevent the bearing from spinning via an anti-rotation pin. More specifically, the gearbox bearing has an outer race and an inner race that rotates with respect to the outer race via one or more rolling elements. As such, the method includes forming a through-hole in front cover of the torque arm of the gearbox and forming a recess in the outer race of the bearing. Thus, the method also includes inserting a connecting member (e.g. an anti-rotation pin) through the through-hole and the recess so as to prevent movement of the outer race of the bearing with respect to a torque arm of the gearbox.

The present disclosure provides many advantages not present in the prior art. For example, the up-tower repair procedure does not require dismantling of the gearbox from the wind turbine generator and therefore does not require large, expensive cranes to lower the defective gearbox to the ground. Rather, the present disclosure provides a simplified, up-tower repair method that saves time and money. As such, the gearbox can be repaired quickly and efficiently, thereby allowing the wind turbine to return to operation as fast as possible.

Figure 1:
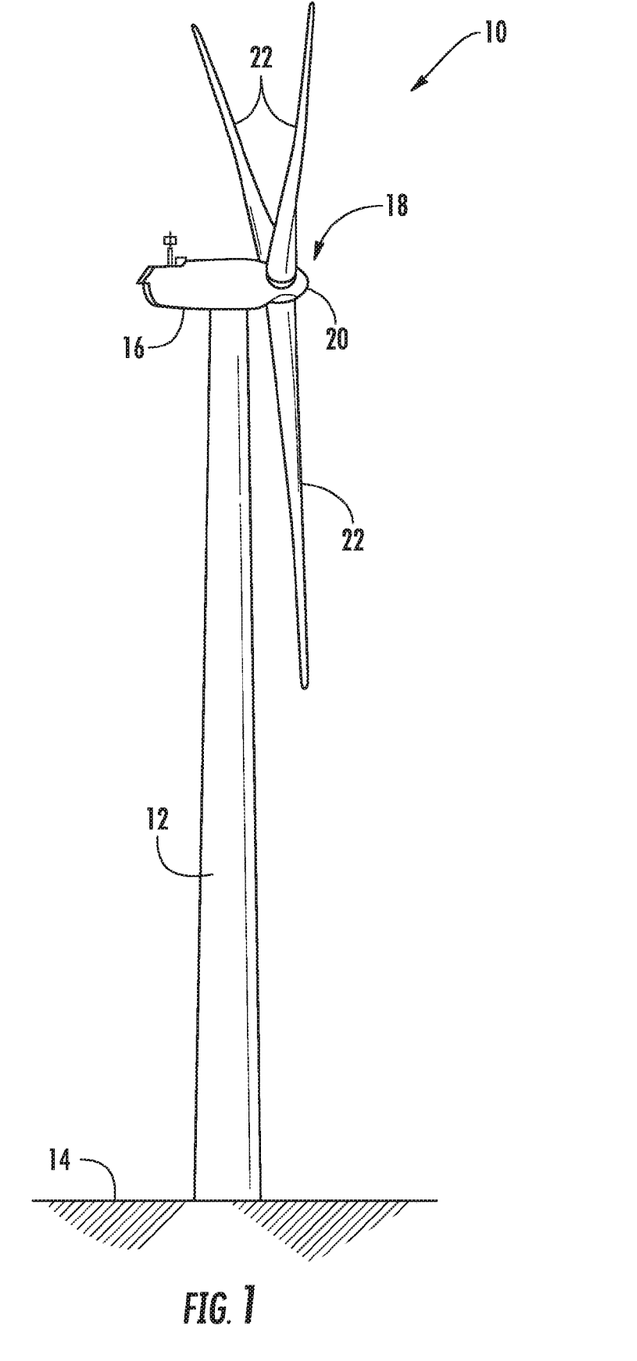
FIG. 1 illustrates a perspective view of a wind turbine according to one embodiment of the present disclosure.

Referring now to the drawings, FIG. 1 illustrates a wind turbine 10 of conventional construction. As shown, the wind turbine 10 includes a tower 12 with a nacelle 16 mounted thereon. A plurality of rotor blades 22 are mounted to a rotor hub 18, which is in turn connected to a main flange that turns a main rotor shaft, as discussed below. The wind turbine power generation and control components are housed within the nacelle 16. The view of FIG. 1 is provided for illustrative purposes only to place the present invention in an exemplary field of use. It should be appreciated that the invention is not limited to any particular type of wind turbine configuration.

Figure 2:
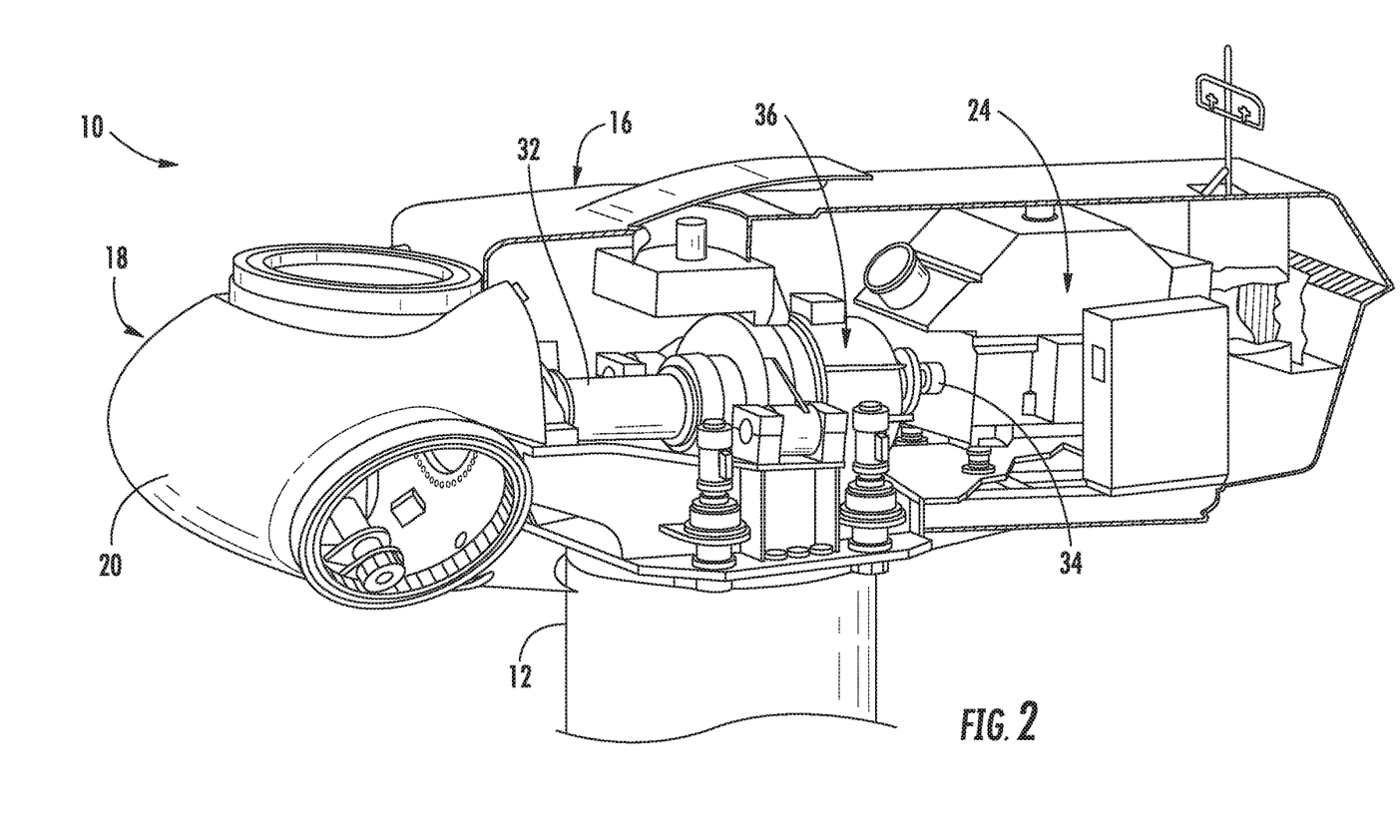
FIG. 2 illustrates a detailed, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Figure 3:
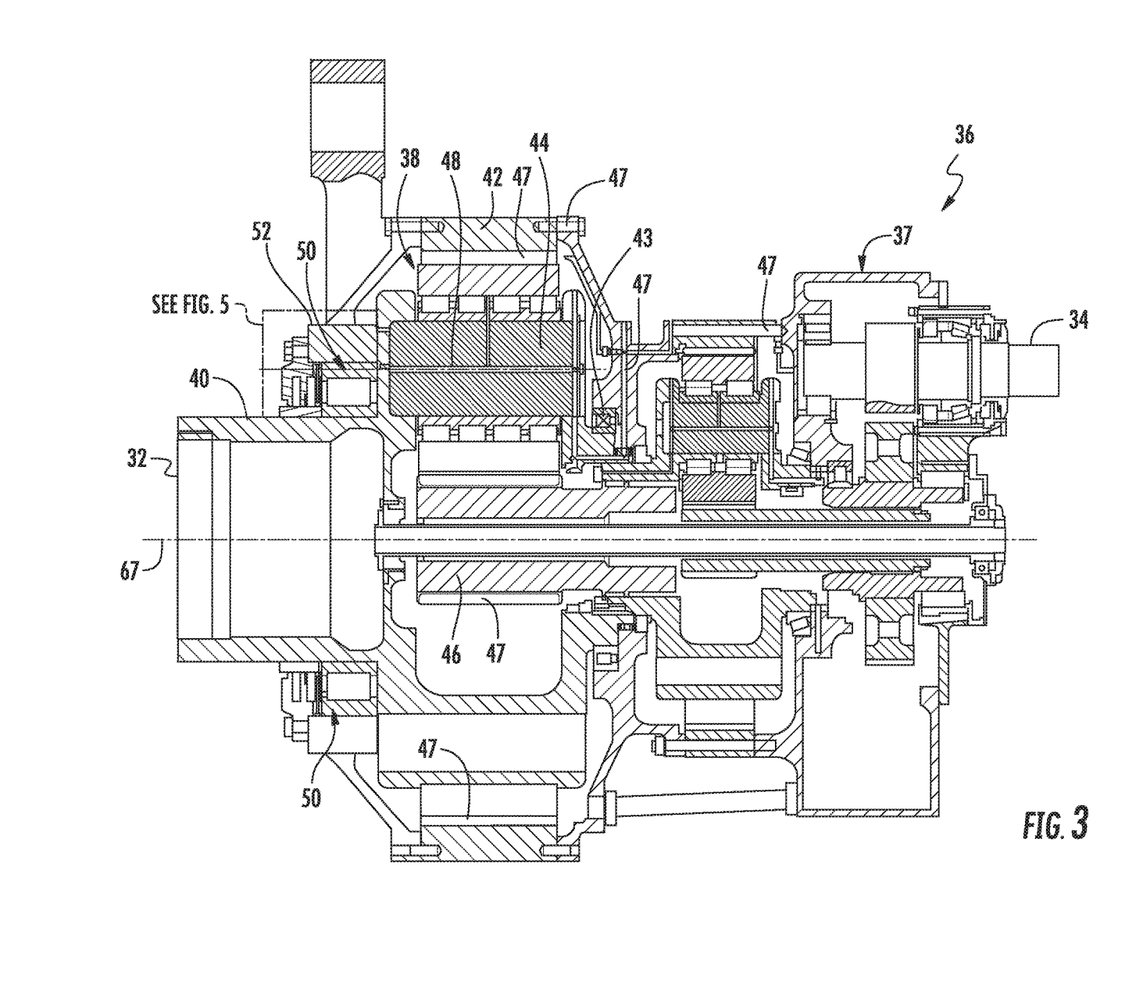
FIG. 3 illustrates a cross-sectional view of one embodiment of a gearbox of a wind turbine according to the present disclosure.

The gearbox 36 may generally include any suitable gearbox components known in the art. For instance, as shown in FIG. 3, the gearbox 36 may include a planetary gear system 38 housed within a gearbox housing 37. More specifically, in certain embodiments, the gear system 38 may include a plurality of gears (e.g., planetary, ring and/or sun gears) and bearings 43 for converting the low speed, high torque input of the rotor shaft 32 to a high speed, low torque output for the generator 24. For example, as shown, the rotor shaft 32 may provide an input load to the system 38 and the system 38 may provide an output load to the generator 24 (FIG. 2) as is generally known in the art. Thus, during operation, an input load at an input rotational speed is transmitted through the planetary gear system 38 and provided as an output load at output rotational speed to the generator 24.

In exemplary embodiments, the planetary gear system 38 may be a single-stage planetary gear system 38. Thus, the input rotational speed may be converted to the output rotational speed through a single stage of various mating gears, as discussed below. Alternatively, however, the planetary gear system 38 may be a multiple-stage planetary gear system 38, and the input rotational speed may be converted to the output rotational speed through multiple stages of various mating gears.

Figure 4:
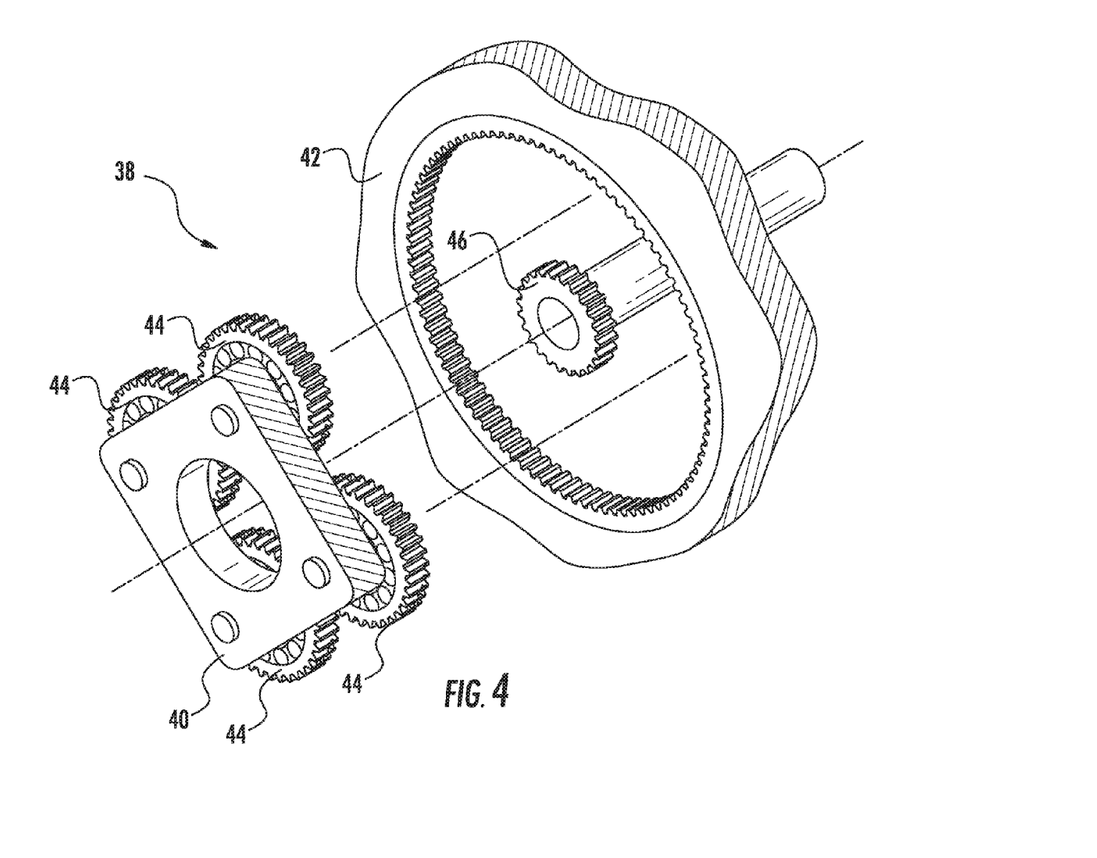
FIG. 4 illustrates an exploded perspective view of one embodiment of a planetary gear system of a gearbox of a wind turbine according to the present disclosure.

More specifically, as shown in FIGS. 3 and 4, the planetary gear system 38 may include a planetary carrier 40 operatively coupling a plurality of gears. For example, as shown, the planetary gear system 38 may include a ring gear 42, one or more planet gears 44, and/or a sun gear 46. Further, the planetary gear system 38 may include one, two, three, four, or more planet gears 44. Further, each of the gears 42, 44, 46 may include a plurality of mating teeth. As such, the teeth are sized and shaped to mesh together such that the various gears 42, 44, 46 engage each other. For example, the ring gear 42 and the sun gear 46 may each engage the planet gears 44. In addition, it should be understood that the gears 42, 44, 46 as described herein may include any suitable type of gears, including but not limited to spur gears, face gears, worm gears, helical gears, double helical gears, or similar. In addition, in some instances the carrier 40 may be stationary. In such embodiments, the input shaft 32 may be coupled to the ring gear 42 such that input loads on the rotor shaft 32 are transmitted through the ring gear 42 to the planet gears 44. Thus, the ring gear 42 may drive the system 38. In alternative embodiments, the ring gear 42 may be stationary. In these embodiments, the input shaft 32 may be coupled to the carrier 40 such that input loads on the rotor shaft 32 may be transmitted through the carrier 40 to the planet gears 44. Thus, the carrier 40 may drive the gear system 38.

Figure 5:
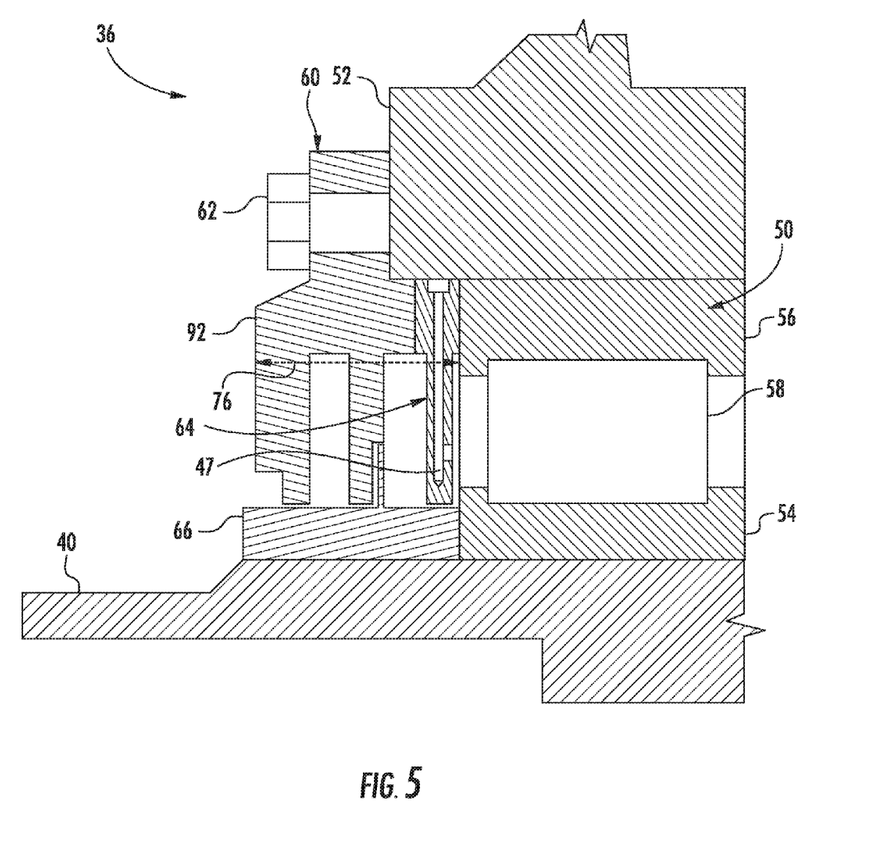
FIG. 5 illustrates a detailed, cross-sectional view of a portion of one embodiment of gearbox according to the present disclosure, particularly illustrating a front gearbox bearing before maintenance is performed, i.e. in an installed position.

Referring now to FIGS. 3 and 5, various views of the front gearbox bearing 50 (i.e. carrier bearing 50) are illustrated. As shown particularly in FIG. 5, the carrier bearing 50 is located between the torque arm 52 and the carrier 40. In addition, the front gearbox bearing 50 typically has an inner race 54 and an outer race 56. Further, as shown, the outer race 56 may be secured to a stationary component of the gearbox 36, for example, the torque arm 52. Moreover, the outer race 56 may be secured to the torque arm 52 using any suitable attachment methods known in the art. More specifically, the outer race 56 may be secured to the torque arm 52 via a press fit, fasteners, adhesive, or similar. In addition, the inner race 54 may be secured to a rotating component, e.g. the carrier 40, such that the inner race 54 rotates with the carrier 40. Further, the inner race 54 may be secured to the carrier 40 using any suitable attachment methods known in the art. For example, in one embodiment, the inner race 54 may be secured to the carrier 40 via a press fit, fasteners, adhesive, or similar. Moreover, a plurality of rolling elements 58 may be disposed between the inner race 54 and the outer race 56 such the inner race 54 rotates within respect to the outer race 56. In certain embodiments, the rolling elements 58 may be cylindrical, spherical, or any other suitably-shaped rolling element that allow the inner and outer races 54, 56 to rotate with respect to each other.

Still referring to FIG. 5, a partial, cross-sectional view of the gearbox 36 according to the present disclosure is illustrated. As shown, the gearbox 36 includes a front cover 60 secured to the torque arm 52, e.g. via a fastener 62, in an installed or operating position. More specifically, a distance 76 is defined between a machining-entry side 92 of the front cover 60 (which will be discussed in more detail below) and the gearbox bearing 50. Thus, as shown, the front cover 60 generally provides protection to the front gearbox bearing 50. In addition, in certain embodiments, the gearbox 38 may include an oil slinger 66 configured between the carrier 40 and the front cover 60 and an oil spray ring 64 configured between the front cover 60 and the bearing 50 so as to provide lubrication to the bearing 50 as needed during operation. For example, as shown, the oil spray ring 64 may include one or more oil passages 47 (also shown in FIG. 3) that provide lubrication to one or more locations of the bearing 50.

Figure 6:
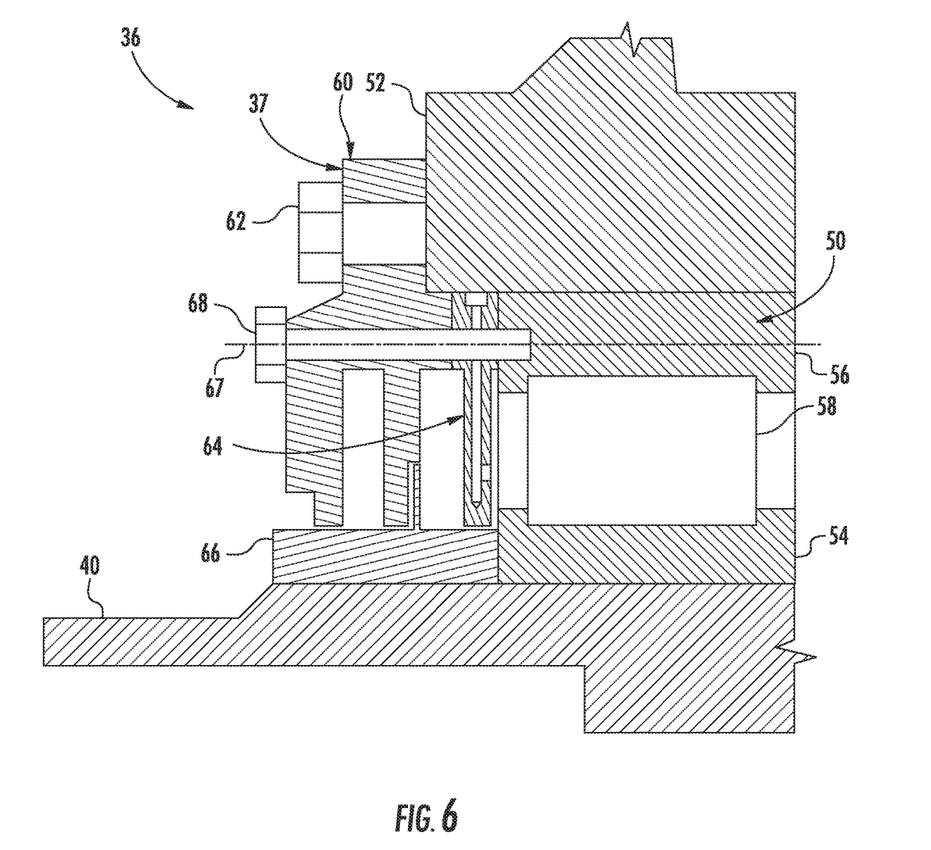
FIG. 6 illustrates a detailed, cross-sectional view of a portion of one embodiment of gearbox according to the present disclosure, particularly illustrating a front gearbox bearing after maintenance has been performed.

In some instances, as mentioned, the gearbox bearing 50 may become worn, e.g. due to continued operation, or may include a design flaw. For example, the outer race 56 may include a design flaw and/or deterioration from extended use of the gearbox 36, which may cause the outer race 56 to move with respect to the torque arm 52. Thus, as shown in FIG. 6, the gearbox 36 may be repaired using a connecting member 68 which secures the outer race 56 to a portion of the gearbox front cover 60. More specifically, the following steps discuss the repair method of the gearbox 38, e.g. by securing the outer race 56 to the front cover 60. Any suitable portion of the gearbox 36, however, may be used to prevent movement of the outer race 56 with respect to the torque arm 52. While the following steps will be discussed referring to securing the outer race 56 of the bearing 50 to the front cover 60, alternatively, other gearbox designs may be configured such that the inner race 54 is stationary and the outer race 56 rotates. Thus, for some other gearbox designs, the inner race 54 may be secured to a portion of the front cover 60.

Figure 7:
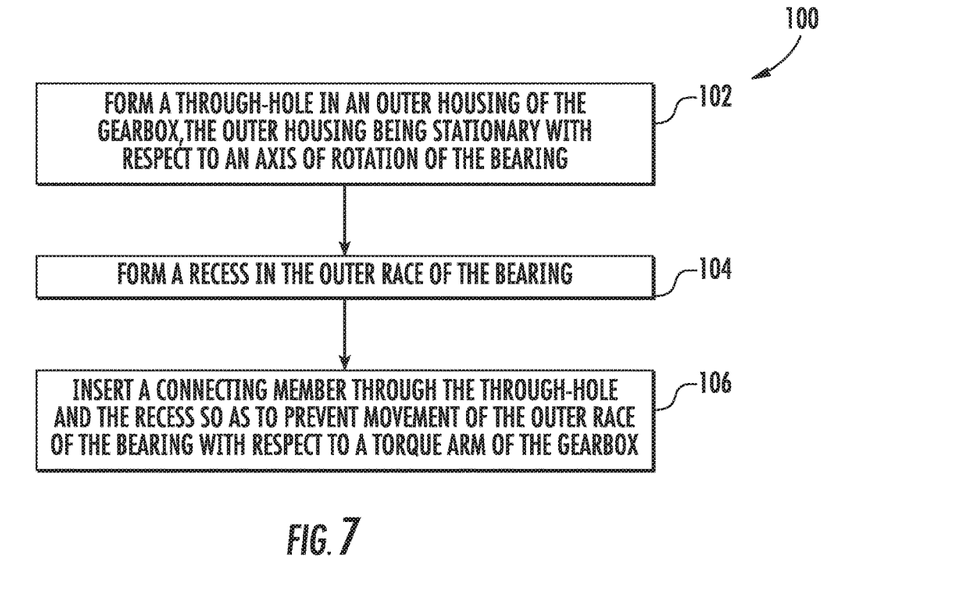
FIG. 7 illustrates a flow diagram of one embodiment of a method for performing up-tower maintenance on a gearbox of a wind turbine according to the present disclosure.
Figure 8:
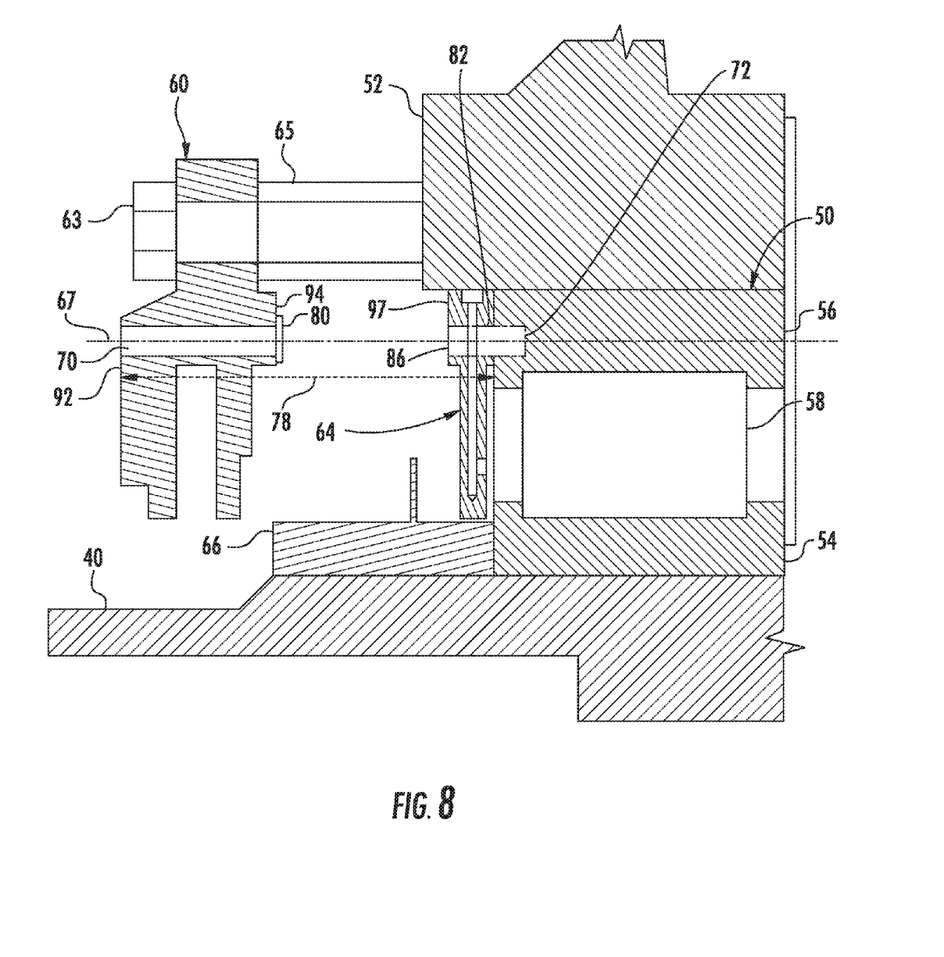
FIG. 8 illustrates a detailed, cross-sectional views of a portion of one embodiment of gearbox according to the present disclosure, particularly illustrating a front gearbox bearing moved to a maintenance position.

More specifically, as shown in FIG. 7, a flow diagram of one embodiment of a method 100 for performing up-tower maintenance on the gearbox 38 of the wind turbine 10 is illustrated. As shown at 102, the method 100 includes forming a through-hole 70 in the front cover 60 of the gearbox 38. More specifically, the step of forming the through-hole 70 in the front cover 60 may include, for example, machining or drilling the through-hole 70 through the front cover 60. Further, as shown in FIGS. 5-6 and 8, the front cover 60 is stationary with respect to an axis 67 of rotation of the bearing 50.

The process of machining or drilling the through-hole 70 of the front cover 60 may generate debris such as e.g., machining chips (not shown). Machining chips can be harmful to the bearing 50 or other components. Thus, several of the method steps described herein may prevent debris generated from forming steps from contacting the bearing 50 and/or other components. For example, in certain embodiments, as shown in FIG. 8, the front cover 60 may be moved from the installed position (FIG. 5) to a maintenance position (FIG. 8), i.e., before forming the through hole 70. As such, the maintenance position provides a machining-entry side 92 of the front cover 60 being disposed at a greater distance 78 from the bearing 50 than the installed position (FIG. 5), thereby reducing a likelihood of machining chips entering the bearing 50. Thus, in the maintenance position, the through-hole 70 may be formed in the front cover 60 by drilling from the machining-entry 92 side to the machining-exit 94 side of the front cover 60. In addition, the method 100 may include applying a covering 80 at a machining-exit side 94 of the through-hole 70 of the front cover 60. Thus, the covering 80 is configured to prevent machining chips or scraps from exiting the through-hole 70 of the front cover 60. More specifically, in certain embodiments, the covering 80 may be constructed of at least one of plasticine, plastic, rubber, silicone, a metal, a metal alloy, or any other suitable material.

In addition, as shown, the oil slinger 66 and/or the oil spray ring 64 may also be removed from the installed position to a maintenance position. More specifically, for gearbox components installed via an interference fit, heat may be applied to the components such that the components expand and can be easily removed. For example, the oil slinger 66 may be heated such that it can be removed from the planetary carrier 40.

After the front cover 60 is moved to the maintenance position, the front cover 60 may be secured before machining of the through-hole 70 begins. For example, as shown in FIG. 8, the original fastener 62 may be removed, and a longer fastener 63 may be used to secure the front cover 60 in the maintenance position, e.g. away from the bearing 50. In addition, as shown, a spacer 65 may be inserted between the front cover 60 and the torque arm 52. Thus, the replacement fastener 63 provides a greater distance 78 between the front cover 60 and the bearing 50 during machining to prevent machining chips from entering the bearing 50.

Figure 9:
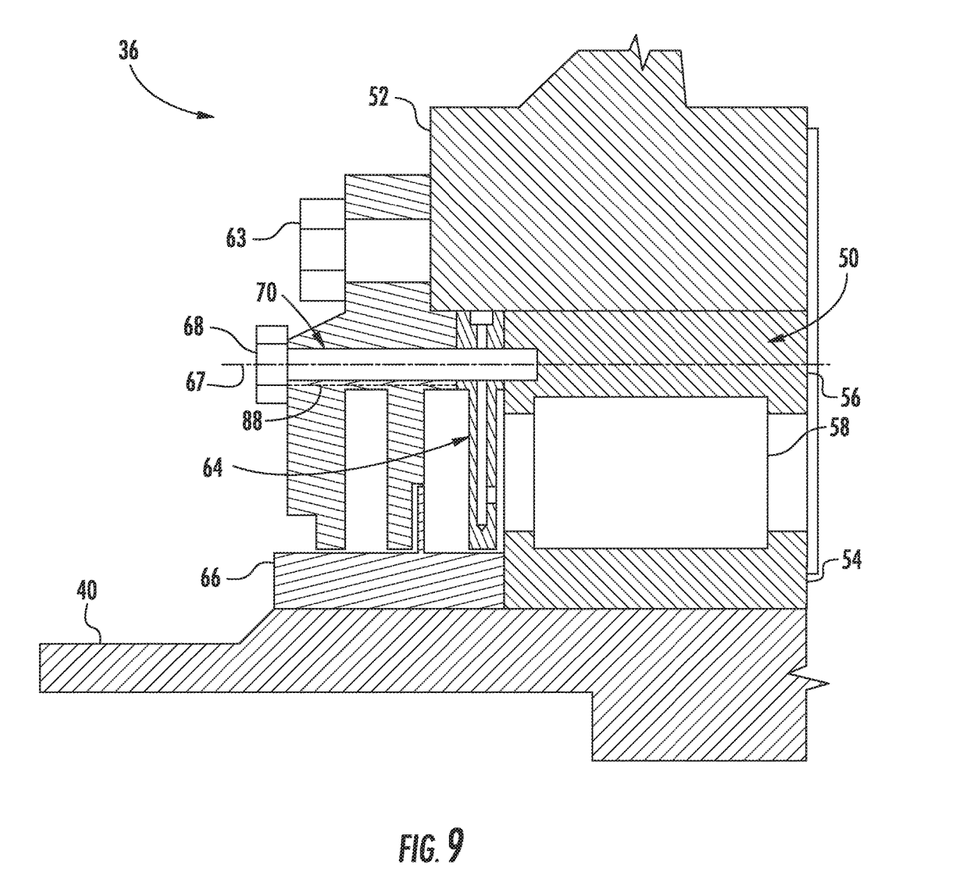
FIG. 9 illustrates a detailed, cross-sectional views of a portion of one embodiment of gearbox according to the present disclosure, particularly illustrating a front cover of the gearbox being reinstalled after repair.
Figure 10:
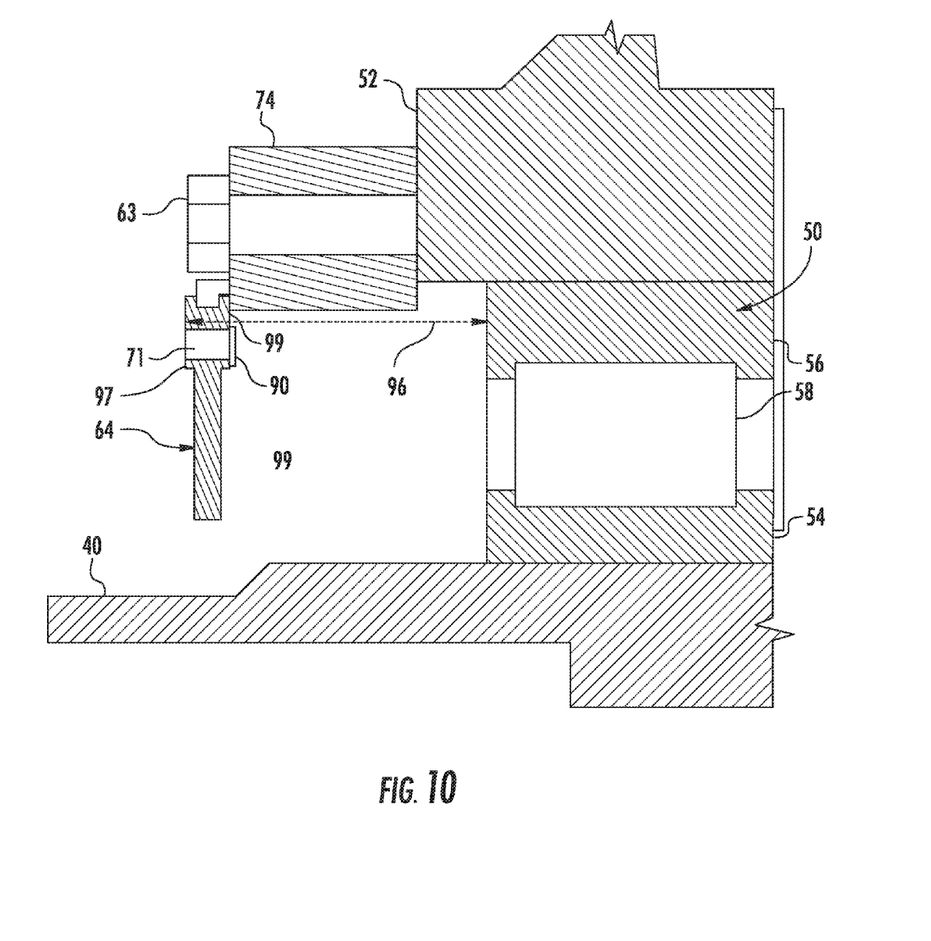
FIG. 10 illustrates a detailed, cross-sectional view of a portion of one embodiment of gearbox according to the present disclosure, particularly illustrating an oil spray ring moved to maintenance position.

As shown at 104, the method 100 also includes forming a recess 72 in the outer race 56 of the bearing 50. More specifically, in certain embodiments, after the through-hole 70 is formed in the front cover 60, the front cover 60 may be pushed towards the rotor 18 in order to create enough space for subsequent machining steps, e.g. as shown in FIG. 9. In additional embodiments, the method 100 may also include forming a through-hole 82 in an oil spray ring 64 of the gearbox 38. More specifically, using clamp tooling to press the oil spray ring 64 such that it does not shift during machining, a machining device, e.g. a drill bit, can be used to form a through-hole 82 starting at a machining-side entry 97 through the oil spring ring 64 to a machining-side exit 99. In alternative embodiments, as shown in FIG. 10, the step of forming the through-hole 82 in the oil spray ring 64 may include uninstalling the oil spray ring 64 from the installed position, moving the oil spray ring 64 to a maintenance position, and securing the oil spray ring 64 in the maintenance position, i.e. a distance 96 away from the bearing 50. More specifically, as shown, the oil spray ring 64 may be secured to a mounting device 74 that is mounted to the torque arm 52. Thus, in the maintenance position, the machining-entry side 97 of the oil spray ring 64 may be disposed at a greater distance 96 from the bearing 50 than in the installed position. In still another embodiment, the method 100 may include applying a cover 90 at the machining-exit side 99 of the through-hole 82 of the oil spray ring 64. Thus, the cover 90 is configured to prevent machining chips or scraps from exiting the through-hole 82 during the machining process.

In addition, the method 100 may include locating an oil lubrication channel or passage 47 in the oil spray ring 64 before forming the through-hole 82 therein and selecting a location for the through-hole 82 in the oil spray ring 64 such that the location does not intersect the oil lubrication channel 47. As such, the method 100 is configured to avoid drilling the through-hole 82 through the oil lubrication channel 47. Any suitable technique known in the art may be used to locate the oil lubrication channel 47 inside the oil spray ring 64. For example, in certain embodiments, for example, the step of locating the oil lubrication passage(s) 47 in the oil spray ring 64 may include using an ultrasonic testing scan. In addition, the through-hole 82 of the oil spray ring 64 may substantially align with the through-hole 70 in the front cover 60 and the recess 72 in the bearing 50 such that a connecting member 68 as described below can be inserted into the aligned through holes.

When selecting the through-hole 82 location, however, an initial location may be selected that undesirably intersects the oil lubrication channel 47 in the oil spray ring 64. As such, a new location for the through-hole 82 may be selected which does not intersect the oil lubrication channel 47 but that still aligns with the through-hole 70 in the front cover 60 and the recess 72 in the bearing 50 to within an acceptable distance such that connecting member 68 may be inserted within both of the through-hole 70 and the recess 72.

In further embodiments, the method 100 may further include providing a collection device 88 adjacent to the oil spray ring 64 during machining. Thus, in certain embodiments, the collection device 88 is configured for collecting machining chips generated during one or more of the machining steps. More specifically, as shown in FIG. 9, the collection device 88 may include a clearance hole within the through-hole 70 of the front cover 60 that is configured to collect machining chips while forming the through-hole 82 of the oil spray ring 64 and/or the recess 72.

Further, as shown at 106, the method 100 includes inserting a connecting member 68 through the through-hole 70 of the front cover 60 and the recess 72 of the outer race 56 so as to prevent movement of the outer race 56 of the bearing 50 with respect to the torque arm 52. More specifically, where applicable, the connecting member 68 may also be inserted through the through-hole 82 of the oil spray ring 64. Thus, the outer race 56 may be secured so as to prevent movement with respect to an axis 67 of rotation of the bearing 50. The connecting member 68 as described herein may include any suitable fastener or pin that fits within the aligned through-holes and/or recesses as described herein, e.g. 70, 72, 82. As such, the connecting member 68 may be threaded such that the connecting member 68 may be screwed into one or more of the front cover 60, the oil spray ring 64, or the recess 72. Alternatively, or in addition to the method described above, the connecting member 68 may be secured by any suitable method known in the art, e.g., welding, adhesives, an interference fit, or similar.

Although the figures generally illustrate an oil spray ring 64 disposed between the bearing 50 and the front cover 60, other gearbox configurations may not have any components between the front cover 60 and the bearing 50. In addition, other gearbox configurations may include components in addition to the oil spray ring 64 disposed between the front cover 60 and the bearing 50. In such cases, through-holes may be formed in any components disposed between the front cover 60 and the bearing 50 such that the outer race 56 may be secured to the front cover 60 the connecting member 68.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing undesirable movement of a bearing of a wind turbine gearbox with respect to a torque arm of the gearbox, the bearing has an outer race and an inner race that rotates with respect to the outer race via one or more rolling elements, the method comprising:

securing the outer race of the bearing to a stationary front cover of a torque arm of the gearbox so as to prevent movement of the outer race of the bearing with respect to the torque arm, wherein the front cover is stationary with respect to an axis of rotation of the bearing.

2. The method of claim 1, wherein securing the outer race of the bearing to the stationary front cover of the torque arm of the gearbox further comprises:
   forming a through-hole in the front cover of the torque arm;
   forming a recess in the outer race of the bearing; and
   inserting a connecting member through the through-hole and the recess so as to prevent movement of the outer race of the bearing with respect to a torque arm of the gearbox.

3. The method of claim 2, further comprising applying a covering at a machining-exit side of the through-hole of the front cover, the covering configured to prevent machining chips or scraps from exiting the through-hole of the front cover.

4. The method of claim 2, wherein the step of forming the through-hole in the front cover further comprises:
   uninstalling the front cover from an installed position; and
   moving the front cover to a maintenance position, wherein the maintenance position provides a machining-entry side of the front cover being disposed at a greater distance from the bearing than the installed position, and
   securing the front cover to the torque arm in the maintenance position, the maintenance position reducing a likelihood of machining chips entering the bearing.

5. The method of claim 4, wherein securing the front cover to the torque arm in the maintenance position further comprises installing a spacer between the front cover and the torque arm and securing the front cover to the torque arm via one or more fasteners.

6. The method of claim 2, further comprising forming a through-hole in an oil spray ring of the gearbox and inserting the connecting member through the through-hole of the front cover, the through-hole of the oil spray ring and the recess of the outer race so as to prevent movement of the outer race of the bearing with respect to the torque arm of the gearbox.

7. The method of claim 6, further comprising;
   locating an oil lubrication channel in the oil spray ring before forming the through-hole in the oil spray ring; and,
   selecting a location for the through-hole in the oil spray ring such that the location does not intersect the oil lubrication channel.

8. The method of claim 7, wherein the step of locating the oil lubrication channel in the oil spray ring further comprises using an ultrasonic testing scan.

9. The method of claim 8, further comprising providing a collection device adjacent to the oil spray ring, the collection device configured for collecting machining chips generated during one or more of the forming steps.

10. The method of claim 9, wherein the collection device comprises a clearance hole within the through-hole of the front cover.

* * * * *